United States Patent
Seagraves et al.

(10) Patent No.: US 9,863,789 B2
(45) Date of Patent: Jan. 9, 2018

(54) ROTATING CAMERA SYSTEMS AND METHODS

(71) Applicant: Ford Global Technologies, LLC, Dearborn, MI (US)

(72) Inventors: Jamel Seagraves, Mountain View, CA (US); Sudipto Aich, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/788,388

(22) Filed: Jun. 30, 2015

(65) Prior Publication Data

US 2017/0001577 A1    Jan. 5, 2017

(51) Int. Cl.
| | |
|---|---|
| *G01D 5/347* | (2006.01) |
| *G03B 17/56* | (2006.01) |
| *B60R 1/00* | (2006.01) |
| *B60R 11/04* | (2006.01) |

(52) U.S. Cl.
CPC ............ *G01D 5/3473* (2013.01); *B60R 1/00* (2013.01); *B60R 11/04* (2013.01); *G03B 17/561* (2013.01); *B60R 2300/101* (2013.01)

(58) Field of Classification Search
USPC ........................................................ 396/428
See application file for complete search history.

(56) References Cited

U.S. PATENT DOCUMENTS

| | | | | |
|---|---|---|---|---|
| 5,751,344 A | * | 5/1998 | Schnee | B63B 45/02 348/113 |
| 6,535,242 B1 | * | 3/2003 | Strumolo | B60R 11/04 348/148 |
| 7,151,565 B1 | * | 12/2006 | Wada | H04N 7/18 348/143 |
| 7,567,687 B2 | * | 7/2009 | Kudo | B60R 1/00 340/435 |
| 7,733,370 B2 | * | 6/2010 | Werth | B60Q 1/245 348/143 |
| 8,137,008 B1 | * | 3/2012 | Mallano | B60R 11/04 396/427 |
| 8,614,743 B2 | * | 12/2013 | Winsor | G01S 3/7864 348/142 |
| 2002/0008442 A1 | * | 1/2002 | Komoda | H02N 2/0045 310/323.13 |

(Continued)

FOREIGN PATENT DOCUMENTS

| | | |
|---|---|---|
| CN | 203554572 U | 4/2014 |
| KR | 20090035822 A | 4/2009 |

(Continued)

*Primary Examiner* — Clayton E Laballe
*Assistant Examiner* — Linda B Smith
(74) *Attorney, Agent, or Firm* — David R. Stevens; Stevens Law Group

(57) ABSTRACT

Example rotating camera systems and methods are described. In one implementation, an apparatus includes a motor having a camera mounting mechanism and configured to rotate a camera attached to the mounting mechanism. A communication module receives vehicle data from a vehicle. A rotation control module determines a current rotational orientation of the motor and determines a speed and direction to rotate the motor based on the received vehicle data.

17 Claims, 5 Drawing Sheets

(56) References Cited

U.S. PATENT DOCUMENTS

| | | | |
|---|---|---|---|
| 2002/0080016 A1* | 6/2002 | Keirstead | B60R 1/00 340/436 |
| 2009/0213719 A1* | 8/2009 | Chang | G01D 5/3473 369/275.3 |
| 2012/0127310 A1 | 5/2012 | Kim | |
| 2012/0326967 A1* | 12/2012 | Gohng | B60K 35/00 345/156 |
| 2016/0171330 A1* | 6/2016 | Mentese | G06K 9/3233 348/170 |
| 2017/0225628 A1* | 8/2017 | Aich | B60R 11/04 |

FOREIGN PATENT DOCUMENTS

| | | |
|---|---|---|
| KR | 20130043341 A | 4/2013 |
| TW | M485173 U | 9/2014 |

* cited by examiner

ROTATING CAMERA SYSTEMS AND METHODS

TECHNICAL FIELD

The present disclosure relates to systems and methods that rotate a camera based on various information associated with a vehicle.

BACKGROUND

Many individuals enjoy capturing images and recording video while driving a vehicle, such as a car, truck, motorcycle or bicycle. For example, individuals may record the view out the front windshield of a car while driving along a scenic road. Others may record a view while racing their car or motorcycle during a race or other performance event. Existing systems attach cameras, smartphones, and other image capture devices to a vehicle in a fixed position (e.g., capturing images directly in front of the vehicle). This type of fixed mounting position supports the recording of only one angle or viewpoint. A dangerous situation results if a vehicle driver attempts to manually reposition the image capture device while actively driving the vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
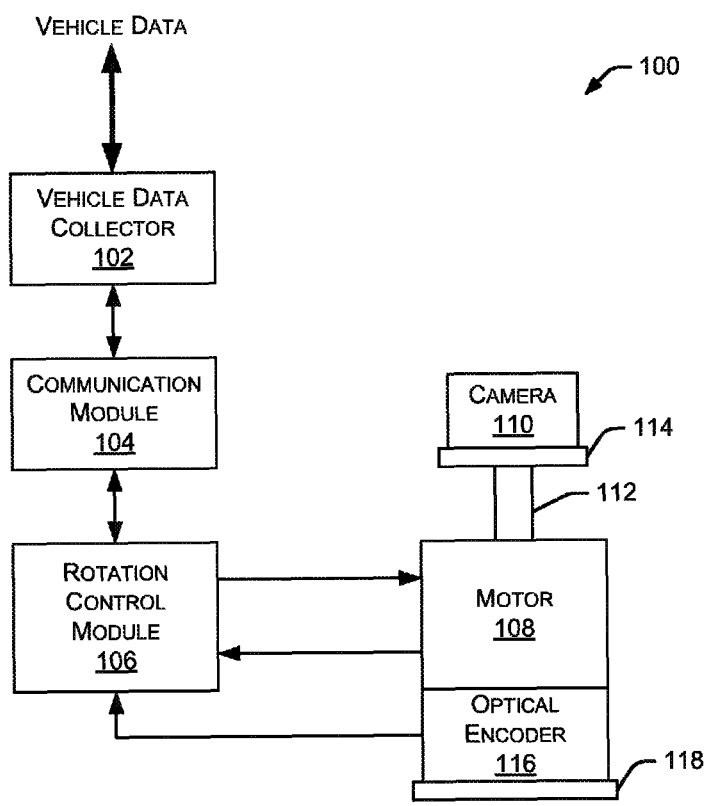
FIG. 1 is a block diagram depicting an embodiment of a rotating camera system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a block diagram depicting an embodiment of a rotating camera system 100. A vehicle data collector 102 receives vehicle data from a vehicle to which the rotating camera system 100 is mounted. The vehicle data includes, for example, vehicle speed, vehicle location, vehicle orientation, steering angle, rotational speed of the steering wheel, lateral acceleration, and yaw rate of the vehicle. The vehicle data may be provided by one or more sensors and/or vehicle control systems associated with the vehicle, such as speed sensors, steering angle sensors, yaw sensors, acceleration sensors, gyros, GPS (global positioning system) modules, and the like. Vehicle data is communicated to vehicle data collector 102 using any communication medium (e.g., wired or wireless) and any communication protocol. In some embodiments, vehicle data is received by vehicle data collector 102 on a continuous basis such that the vehicle data is substantially real-time data. In other embodiments, vehicle data collector 102 receives vehicle data at regular intervals (e.g., every 500 milliseconds or every second).

A communication module 104 is coupled to vehicle data collector 102 and receives at least a portion of the vehicle data received by the vehicle data collector. Communication module 104 communicates the vehicle data to a rotation control module 106, which manages the operation of a motor 108, as discussed herein. Motor 108 includes a drive shaft 112 coupled to a plate 114, to which a camera 110 is mounted. As motor 108 rotates drive shaft 112, camera 110 rotates in a corresponding manner. Rotation control module 106 determines whether motor 108 needs to be rotated based on a desired orientation of the camera and the current vehicle data. In some embodiments, motor 108 can rotate drive shaft 112 in a clockwise manner or a counter-clockwise manner. Additionally, motor 108 can rotate drive shaft 112 at different speeds depending on how quickly the orientation of the camera needs to be changed. Plate 114 is also referred to as a "mounting plate," and allows camera 110 to be mounted to motor 108. Plate 114 may include any type of mounting mechanism (not shown) to secure camera 110 to plate 114, such as clips, screws, clamps, adhesive, hook-and-loop fasteners, and the like.

Additionally, an optical encoder 116 is associated with motor 108 and determines the rotational position of motor 108 and/or shaft 112. Optical encoder communicates the rotational position of motor 108 or shaft 112 to rotation control module 106, which is used by the rotation control module (along with the current vehicle data) to determine whether drive shaft 112 needs to be rotated to maintain camera 110 in its desired orientation. As motor 108 rotates drive shaft 112, optical encoder 116 communicates updated rotational position information to rotation control module 106.

A vehicle mount 118 secures one or more of the components shown in FIG. 1 to a vehicle. For example, vehicle mount 118 may be attached to a car dashboard, car windshield, car window, car roof rack, car mirrors, motorcycle handlebar, bicycle handlebar, and the like. Vehicle mount 118 is shown as attached to optical encoder 116, but can be attached to motor 108, rotation control module 106 or any other component or system. Vehicle mount 118 may use any type of mounting mechanism (not shown) to attach the mount to a vehicle, such as clips, screws, clamps, adhesive, hook-and-loop fasteners, and the like. In a particular embodiment, multiple components shown in FIG. 1 are contained within a housing or similar structure. That housing is attached to vehicle mount 118 for mounting to a vehicle.

Although multiple separate components are shown in FIG. 1, particular implementations may combine multiple components together. For example, communication module 104 may be combined with vehicle data collector 102 and/or rotation control module 106.

In alternate embodiments, vehicle data collector 102 and communication module 104 are replaced with a mobile device, such as a smartphone or tablet computer. In these embodiments, the mobile device communicates with one or more vehicle systems to receive vehicle data. The mobile device further communicates the data to rotational control module 106. The mobile device can communicate with the vehicle systems and rotational control module 106 using any communication medium (e.g., wired or wireless) and any communication protocol. In some implementations, the mobile device may also include an application that performs the functions of rotation control module 106 (i.e., determining whether motor 108 needs to be rotated based on a desired orientation of the camera and the current vehicle data). The application can also communicate with motor 108 and optical encoder 116 via the mobile device on which the application is executing.

Figure 2:
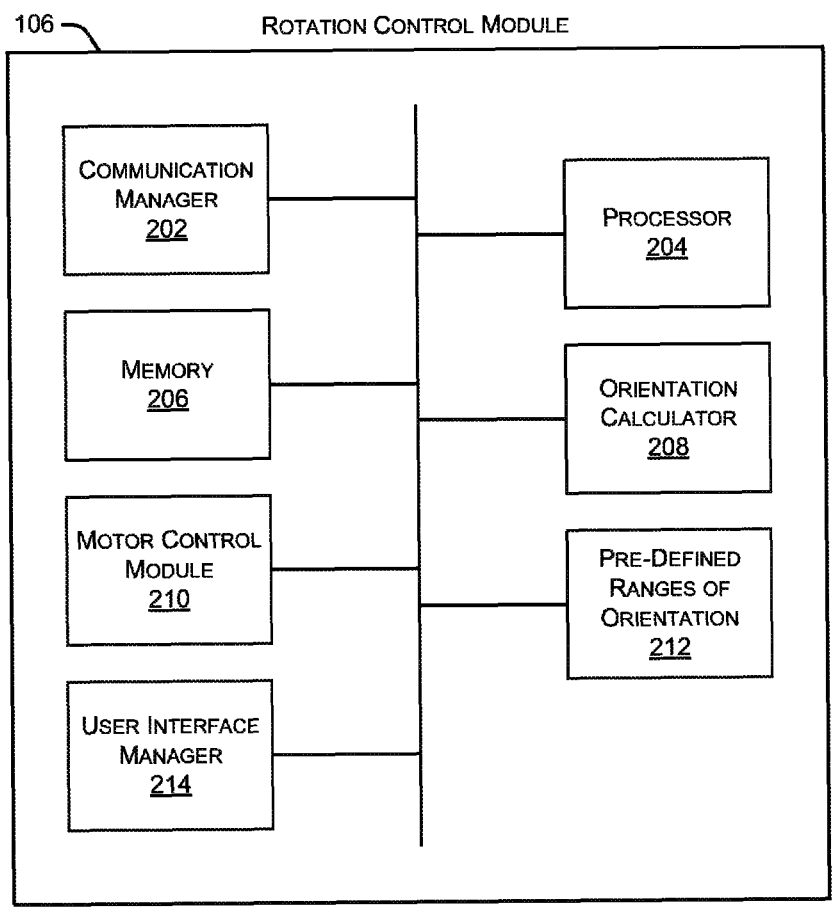
FIG. 2 is a block diagram depicting an embodiment of a rotation control module.

FIG. 2 is a block diagram depicting an embodiment of rotation control module 106. As shown in FIG. 2, rotation control module 106 includes a communication manager 202, a processor 204, and a memory 206. Communication manager 202 allows rotation control module 106 to communicate with other systems, such as communication module 104, motor 108, and the like. Processor 204 executes various instructions to implement the functionality provided by rotation control module 106. Memory 206 stores these instructions as well as other data used by processor 204 and other modules contained in rotation control module 106.

Additionally, rotation control module 106 includes an orientation calculator 208 that determines a desired orientation of motor 108, which corresponds to a desired orientation of camera 110 mounted to motor 108. A motor control module 210 sends signals or commands to motor 108 that instruct the motor to rotate a particular direction, at a particular speed, and until a desired orientation is reached. Motor control module 110 may also receive motor position information from optical encoder 116. One or more pre-defined ranges of orientation 212 are defined to restrict the possible orientations for a particular motor in a specific implementation. A user interface manager 214 supports a user interface that allows a user to define operating parameters for the systems and methods described herein, such as desired camera orientation and pre-defined ranges of orientation.

Figure 3:
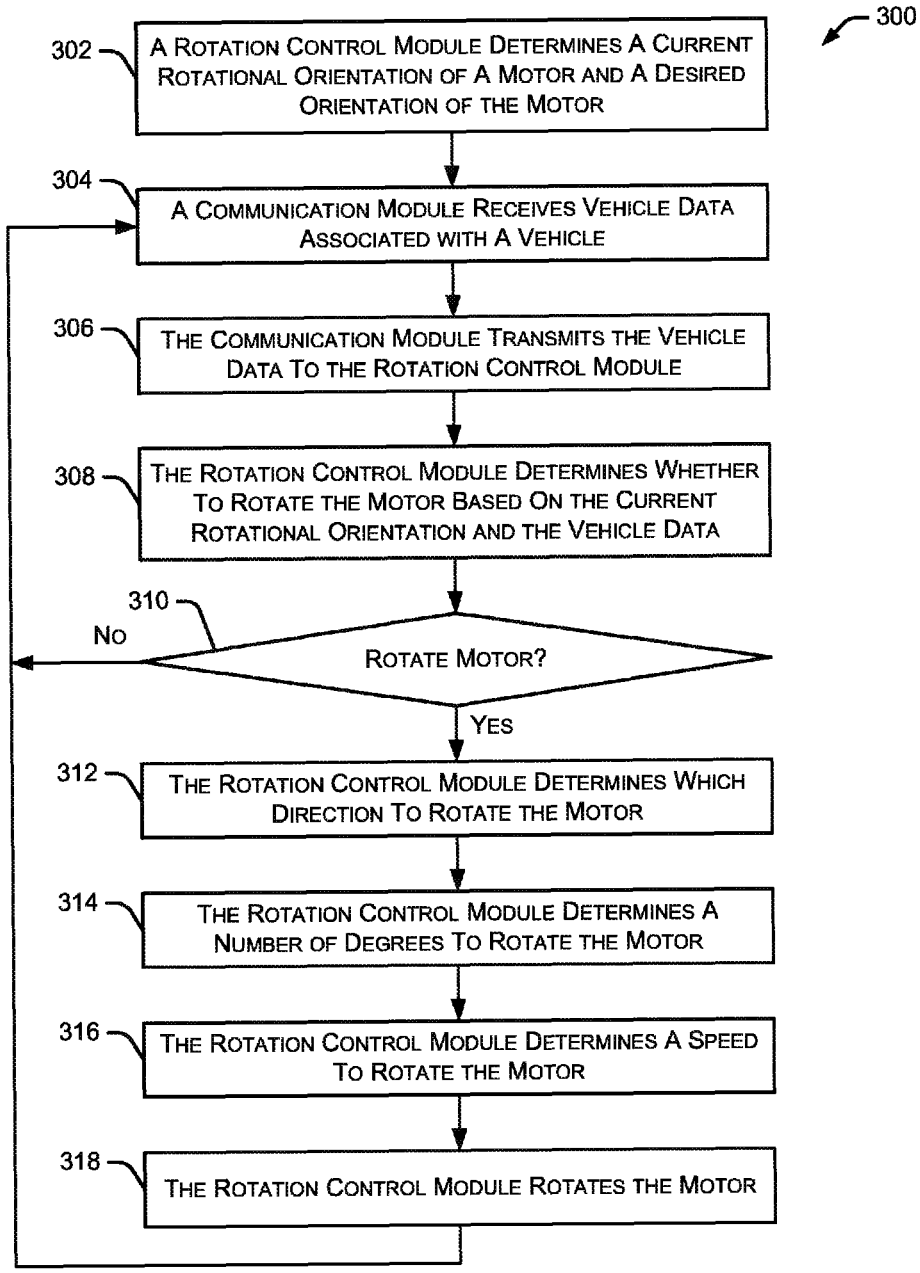
FIG. 3 is a flow diagram depicting an embodiment of a method for rotating a motor based on data received from a vehicle.

FIG. 3 is a flow diagram depicting an embodiment of a method 300 for rotating a motor based on data received from a vehicle. Initially, a rotation control module determines a current rotational orientation of a motor and a desired orientation of the motor at 302. The current rotational orientation can be determined, for example, by an optical encoder or other system capable of determining the orientation of the motor or the orientation of a camera mounted to the motor. The desired orientation is determined, for example, based on a user setting or a pre-defined range of orientations selected by a user. In some embodiments, a user can select or define one or more ranges of orientations using an application executing on a mobile device that communicates with one or more of the systems or components discussed herein. For example, the application may communicate with the described systems or components using Bluetooth, WiFi or any other data communication system. In particular embodiments, an application executing on a mobile device can communicate with the camera as well as one or more of the other systems or components discussed herein.

In some embodiments, one or more vehicle systems (such as an infotainment system) can communicate with the rotating camera system discussed herein. These vehicle systems may also communicate with the camera itself. Alternatively, the vehicle system may communicate with the rotating camera system and/or the camera itself by communicating through an application executing on a mobile device. These embodiments allow a user to control the rotating camera system and/or camera through the user interface of the vehicle systems, such as touch screen controls, steering wheel controls, and the like.

Method 300 continues as a communication module receives vehicle data associated with a vehicle at 304. The communication module transmits the vehicle data to a rotation control module at 306, which determines, at 308, whether to rotate the motor based on the current rotational orientation of the motor/camera and the received vehicle data. For example, if the current orientation of the motor/camera matches the desired orientation and the vehicle is not turning, the motor does not need to be rotated. In this situation, the motor is not rotated at 310 and the method returns to 304 where it continues monitoring changes in the received vehicle data.

If method 300 determines that the motor needs to be rotated at 310, the rotation control module determines which direction to rotate the motor at 312. For example, the motor may be rotated in a clockwise direction or a counter-clockwise direction depending on the necessary orientation change to the motor/camera. The rotation control module also determines a number of degrees to rotate the motor at 314. The amount of rotation depends, for example, on the magnitude of the orientation change necessary to rotate the motor/camera to the desired orientation. Additionally, the rotation control module determines a speed to rotate the motor 316. The speed of rotation depends, for example, on the magnitude of the orientation change necessary as well as current vehicle data, such as a current vehicle speed and a current steering angle of the vehicle. The rotation control module sends appropriate signals to the motor at 318 that instruct the motor to rotate in a particular direction, for a specified number of degrees, at a particular speed based on the above determinations. After rotation of the motor/camera is complete, method 300 returns to 304 and continues monitoring changes in the received vehicle data.

In some embodiments, the rotation direction is determined based on the steering direction of the vehicle. For example, if the vehicle is turning to the left, the motor may rotate to the left to maintain the desired orientation for the camera. In particular implementations, the method determines a new position for the camera and determines the rotation direction and number of degrees to rotate based on this new position. For example, the new position may be calculated by:

new position=x+d where x=current_position−steering_wheel_angle and "current_position" is the current position of the motor and "steering_wheel_angle" is the current angle of the steering wheel.

The value of "x" represents the number of degrees the motor should rotate based on, for example, information received from the optical encoder associated with the motor and the current steering wheel angle (received as part of the vehicle data). The value of "d" represents an offset that could be fixed (e.g., hard-coded) or changed through one or more user interface controls. The offset is used in determining whether to rotate the motor. For example, the motor should not be rotated if the difference between the current motor position and the steering wheel angle is equal to the offset value.

If the motor needs to be rotated, the speed at which to rotate the motor is determined based on the rotational speed of the steering wheel. In some embodiments, the motor rotation speed is based, at least in part, on the yaw rate of the vehicle as determined by a gyroscope, accelerometer or similar device in the vehicle. In particular implementations, the rotational speed of the motor is multiplied by a constant, k, to allow for a faster response time. For example, if w is the rotational speed of the motor based on the rotational speed of the steering wheel, the speed to rotate the motor (to its new position) is: w*k. Typically, there is a delay between when the steering wheel angle changes and when the motor actually starts to rotate. If the motor is always rotated at the same speed as the steering wheel, the motor (and the attached camera) will always lag behind. The constant k gives the motor an opportunity to "catch up" with or overtake the steering wheel angle.

Figure 4:
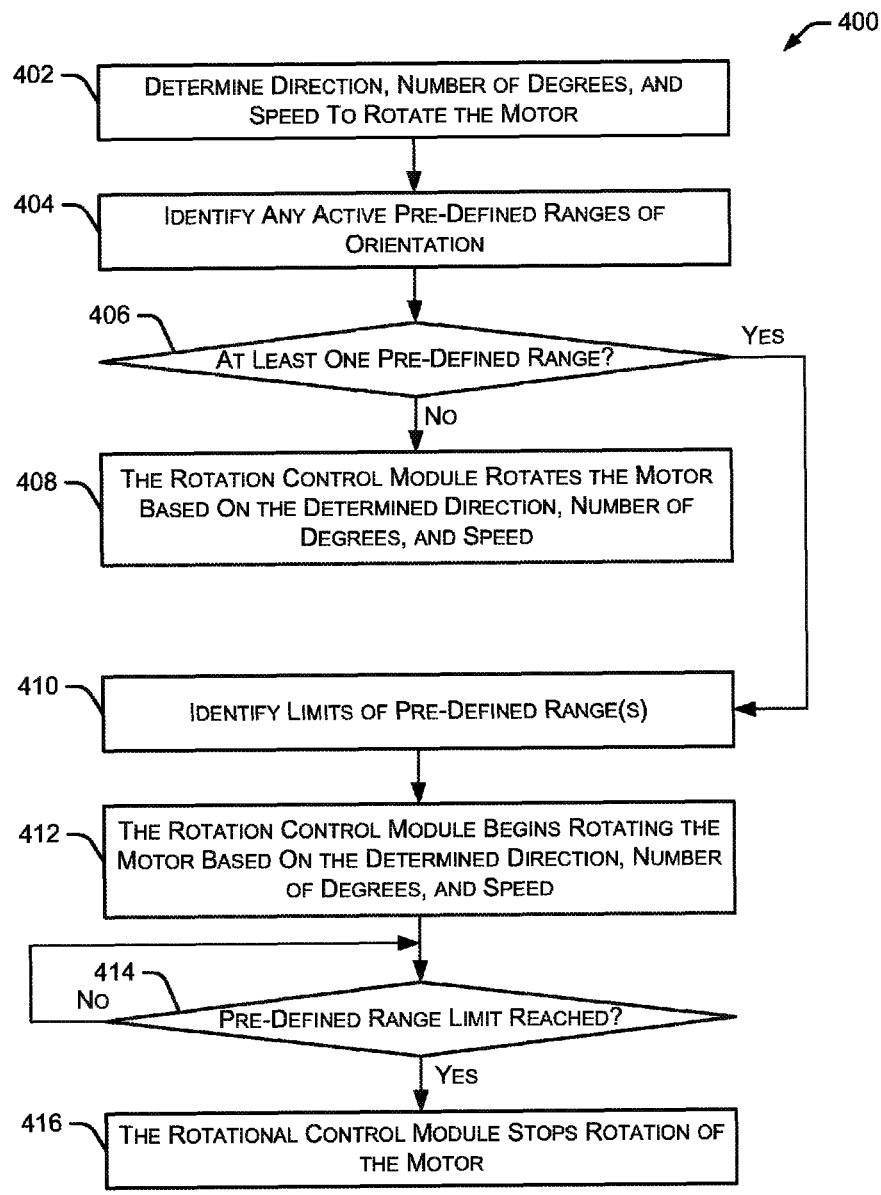
FIG. 4 is a flow diagram depicting an embodiment of a method for rotating a motor based on a pre-defined range of orientation.

FIG. 4 is a flow diagram depicting an embodiment of a method 400 for rotating a motor based on a pre-defined range of orientation. Initially, method 400 determines a direction, number of degrees, and speed to rotate the motor/camera at 402, as discussed above with respect to FIG. 3. The method identifies any active pre-defined ranges of orientation at 404. A range of orientation defines an "operating range" for the view captured by a camera mounted to the motor. For example, a range of orientation my keep the camera pointing primarily forward such as out the front windshield of a car. This range of orientation may allow the camera to rotate within a pre-defined range of angles that deviate slightly from the forward direction. For example, the pre-defined range of angles may allow the camera to rotate between 30 degrees left of center and 30 degrees right of center. The rotation control module controls the motor to keep the camera within this pre-defined range of angles as the car turns. In some embodiments, the rotation control module allows the motor/camera to rotate toward a range limit (e.g., a left limit or a right limit of the range) based on: 1) manual input from the user (e.g., using an application executing on a mobile device); 2) the vehicle's steering wheel angle with a dynamically applied offset "d" (discussed herein) that reduces as a motor/camera orientation approaches a range limit; or 3) a lateral acceleration or yaw rate of the vehicle.

If no pre-defined ranges of orientation are identified at 406, the rotation control module rotates the motor based on the determined direction, number of degrees, and speed at 408, as discussed above with respect to FIG. 3.

If at least one pre-defined range of orientation is identified at 406, the method identifies the limits of the pre-defined ranges of orientation at 410. In some embodiments, one of the pre-defined ranges of orientation will be active (e.g., previously selected by the user). Based on the active pre-defined range of orientation, the rotation control module begins rotating the motor based on the determined direction, number of degrees, and speed at 412. Method 400 determines whether a pre-defined range limit is reached at 414 (e.g., reaching 30 degrees left of center or 30 degrees right of center, as mentioned above). If a pre-defined range limit is not reached, the rotation control module continues rotating the motor based on the determined direction, number of degrees, and speed. However, if a pre-defined range limit is reached, the rotation control module stops rotation of the motor at 416, thereby limiting the motor rotation to the pre-defined range of orientation.

Figure 5A:
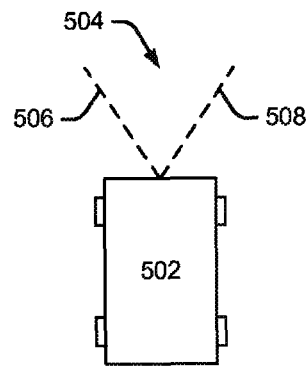
FIGS. 5A and 5B depict multiple pre-defined ranges of orientation associated with a vehicle.
Figure 5B:
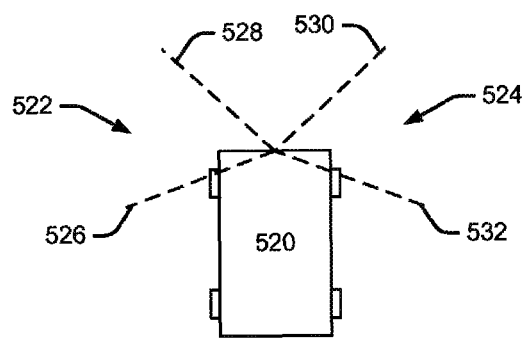

FIGS. 5A and 5B depict multiple pre-defined ranges of orientation associated with a vehicle. In FIG. 5A, a vehicle 502 has a pre-defined range of orientation 504 for a motor/camera mounted to the vehicle (e.g., mounted to the windshield or the dashboard). Pre-defined range of orientation 504 is bounded on the left at 506 and bounded on the right at 508. Thus, the motor/camera in vehicle 502 is limited to rotating within the range defined between boundaries 506 and 508. Once a boundary 506 or 508 is reached, the rotation control module will not allow the motor/camera to rotate beyond that boundary regardless of the vehicle data received. For example, as the motor/camera rotates counter-clockwise (as shown in FIG. 5A, looking down on vehicle 502), if the motor/camera reaches boundary 506, the rotation control module will not allow the motor/camera to rotate any farther in a counter-clockwise direction. However, the motor/camera may rotate clockwise (based on received vehicle data) until boundary 508 is reached.

FIG. 5B illustrates another vehicle 520 that has two pre-defined ranges of orientation 522 and 524 for a motor/camera mounted to the vehicle. Pre-defined range of orientation 522 is bounded on the left at 526 and bounded on the right at 528. Similarly, pre-defined range of orientation 524 is bounded on the left at 530 and bounded on the right at 532. The motor/camera in vehicle 520 is limited to rotating within the range defined between boundaries 526 and 528, or rotating within the range defined between boundaries 530 and 532. For example, if the motor/camera is within pre-defined range of orientation 524 and is being rotated counter-clockwise, when the motor/camera reaches boundary 530, the motor/camera automatically rotates counter-clockwise to the next pre-defined range of orientation (range 522 in this example). Thus, the motor/camera does not stop within the area defined between boundaries 528 and 530.

In some embodiments, the pre-defined ranges of orientation are used to limit the orientation of the motor/camera to capture scenery out the front windshield of the vehicle. In other situations, the user may prefer to see the scenery out a side window of the vehicle and selects a pre-defined range of orientation that maintains the motor/camera within a range that captures images out a side window (e.g., a driver's door window or a passenger door window).

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
   a motor having a camera mounting mechanism and configured to rotate a camera mounted thereto;
   a communication module configured to receive vehicle data from a vehicle; and
   a rotation control module coupled to the motor and the communication module, the rotation control module configured to determine a current rotational orientation of the motor and determine a speed and direction to rotate the motor based on the received vehicle data;
   wherein the vehicle data includes at least one of a current steering angle of the vehicle and a steering wheel rotation speed.

2. The apparatus of claim 1, wherein the rotation control module further determines the speed and direction to rotate the motor based on a desired orientation of the motor.

3. The apparatus of claim 1, further comprising an optical encoder coupled to the motor and the rotation control module, the optical encoder configured to monitor a rotational position of the motor.

4. The apparatus of claim 1, wherein the rotation control module limits the rotation of the motor to a pre-defined range of orientations.

5. The apparatus of claim 1, wherein the rotation control module includes a plurality of pre-defined ranges of orientation and the rotation control module limits the rotation of the motor to maintain the pre-defined ranges of orientation.

6. The apparatus of claim 1, wherein the mounting mechanism includes a mounting plate attached to a drive shaft of the motor, and wherein the mounting plate is configured to secure the camera in an orientation known to the rotation control module.

7. The apparatus of claim 1, wherein the motor, communication module, and rotation control module are mounted outside the vehicle.

8. The apparatus of claim 1, further comprising a vehicle mounting device configured to attach the apparatus to a vehicle.

9. The apparatus of claim 4, wherein the pre-defined range of orientations is selected by a user of the camera.

10. An apparatus comprising:
    a motor having a camera mounting mechanism and configured to rotate a camera mounted thereto;
    a communication module configured to receive vehicle data from a vehicle; and
    a rotation control module coupled to the motor and the communication module, the rotation control module configured to determine a current rotational orientation of the motor and determine a speed and direction to rotate the motor based on the received vehicle data
    wherein a user of the vehicle determines an offset value further used by the rotation control module to determine the speed and direction to rotate the motor.

11. A method comprising:
    receiving a desired orientation of a motor mounted to a vehicle, the motor having a camera mounted thereto;
    receiving vehicle data associated with the vehicle;
    determining, using one or more processors, whether to rotate the motor based on the desired orientation of the motor and the received vehicle data;
    responsive to determining to rotate the motor:
        determining, using the one or more processors, which direction to rotate the motor;
        determining, using the one or more processors, a number of degrees to rotate the motor;
        determining, using the one or more processors, a speed to rotate the motor; and
        generating, using the one or more processors, instructions to rotate the motor based on the direction to rotate the motor, the number of degrees to rotate the motor, and the speed to rotate the motor;
    wherein the vehicle data includes a current steering angle of the vehicle.

12. The method of claim 11, further comprising communicating the instructions to the motor.

13. The method of claim 11, further comprising receiving current rotational position data from the motor.

14. The method of claim 11, wherein the desired orientation of the motor includes a pre-defined range of orientations.

15. The method of claim 11, wherein the desired orientation of the motor includes a plurality of pre-defined ranges of orientations.

16. An apparatus comprising:
a motor having a camera mounting mechanism and configured to rotate a camera mounted thereto;
a communication module configured to receive vehicle data from a vehicle, the vehicle data including a steering wheel rotation speed and steering wheel angle; and
a rotation control module coupled to the motor and the communication module, the rotation control module configured to determine a current rotational orientation of the motor and a desired orientation of the motor, the rotation control module further configured to determine a direction, a speed, and a number of degrees to rotate the motor based on the desired orientation of the motor and the steering wheel rotation speed and the steering wheel angle.

17. The apparatus of claim 16, wherein the rotation control module limits the rotation of the motor to a pre-defined range of orientations.

* * * * *